United States Patent [19]
Seeberger et al.

[11] Patent Number: 5,923,094
[45] Date of Patent: Jul. 13, 1999

[54] ELECTROMECHANICAL CONTROL UNIT FOR ADJUSTING DEVICES IN MOTOR VEHICLES

[75] Inventors: Jürgen Seeberger, Baunach; Eberhard Pleiss, Untersiemau; Manfred Stenzel, Bamberg; Helmut Sesselmann, Steinach, all of Germany

[73] Assignee: Brose Fahrzeugteile GmbH & Co. KG, Coberg, Germany

[21] Appl. No.: 08/930,799

[22] PCT Filed: Apr. 3, 1996

[86] PCT No.: PCT/DE96/00631

§ 371 Date: Dec. 17, 1997

§ 102(e) Date: Dec. 17, 1997

[87] PCT Pub. No.: WO96/31935

PCT Pub. Date: Oct. 10, 1996

[51] Int. Cl.$^6$ ..................................................... H02K 11/00
[52] U.S. Cl. .................................. 307/9.1; 310/71; 439/34
[58] Field of Search .................................. 310/66, 71, 89; 439/43, 52, 53, 577, 928, 34, 76.1, 76.2, 604, 606, 620–622; 307/9.1, 10.1; 701/45, 49; 200/293, 303, 307; 70/237, 275, 277

[56] References Cited

U.S. PATENT DOCUMENTS

| | | |
|---|---|---|
| 2,921,783 | 1/1960 | Wentz . |
| 4,882,842 | 11/1989 | Basson et al. ............................. 29/857 |
| 5,025,184 | 6/1991 | Sekine et al. ............................. 310/71 |
| 5,063,317 | 11/1991 | Bruhn ....................................... 310/71 |
| 5,137,455 | 8/1992 | Moerbe et al. ........................... 439/34 |
| 5,245,258 | 9/1993 | Becker et al. .......................... 318/266 |
| 5,315,194 | 5/1994 | Brusasco et al. ......................... 310/89 |
| 5,382,857 | 1/1995 | Schellhorn et al. ...................... 310/71 |
| 5,408,154 | 4/1995 | Meiser et al. ............................ 310/71 |
| 5,715,630 | 2/1998 | Szerdahelyi et al. ..................... 49/351 |

FOREIGN PATENT DOCUMENTS

| | | |
|---|---|---|
| 3609609 | 10/1987 | Germany . |
| 4323946 | 7/1993 | Germany . |
| 4430700 | 3/1996 | Germany . |
| 63-199121 | 8/1988 | Japan . |
| WO9010558 | 9/1990 | WIPO . |
| WO9101060 | 1/1991 | WIPO . |

*Primary Examiner*—Jeffrey Gaffin
*Assistant Examiner*—Peter Ganjian
*Attorney, Agent, or Firm*—Christie, Parker & Hale, LLP

[57] ABSTRACT

An electromechanical control unit for adjustment devices in motor vehicles which can be used with particular advantage in connection with a window lift drive in a vehicle door. The electromechanical drive, the electronics system and the switch of the electromechanical control unit form one pretestable modular unit. Preferably each switch is in keyed engagement with a cover and is elastically mounted relative to the electronics system, for example through a flexible flat band cable connection.

15 Claims, 6 Drawing Sheets

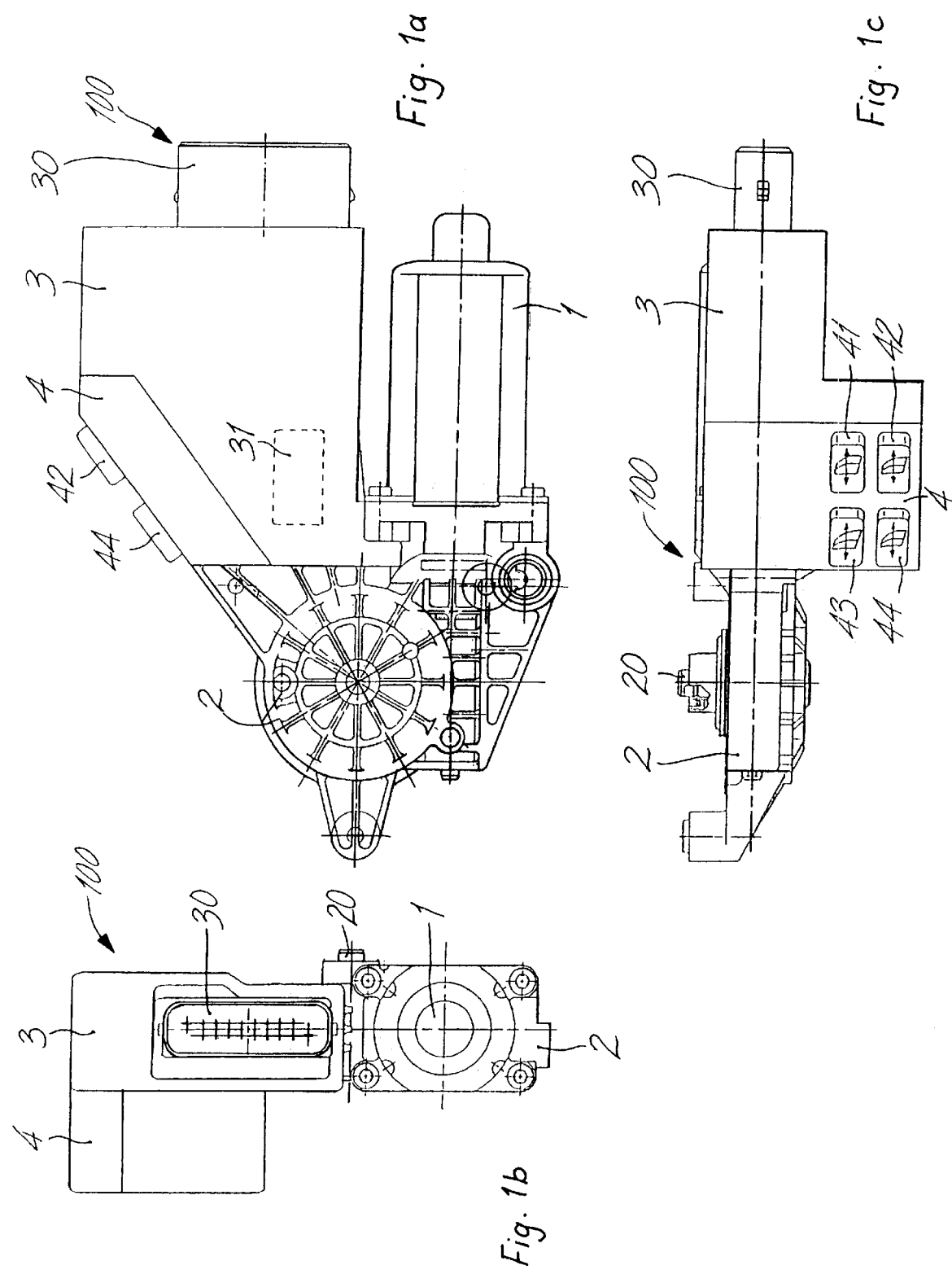

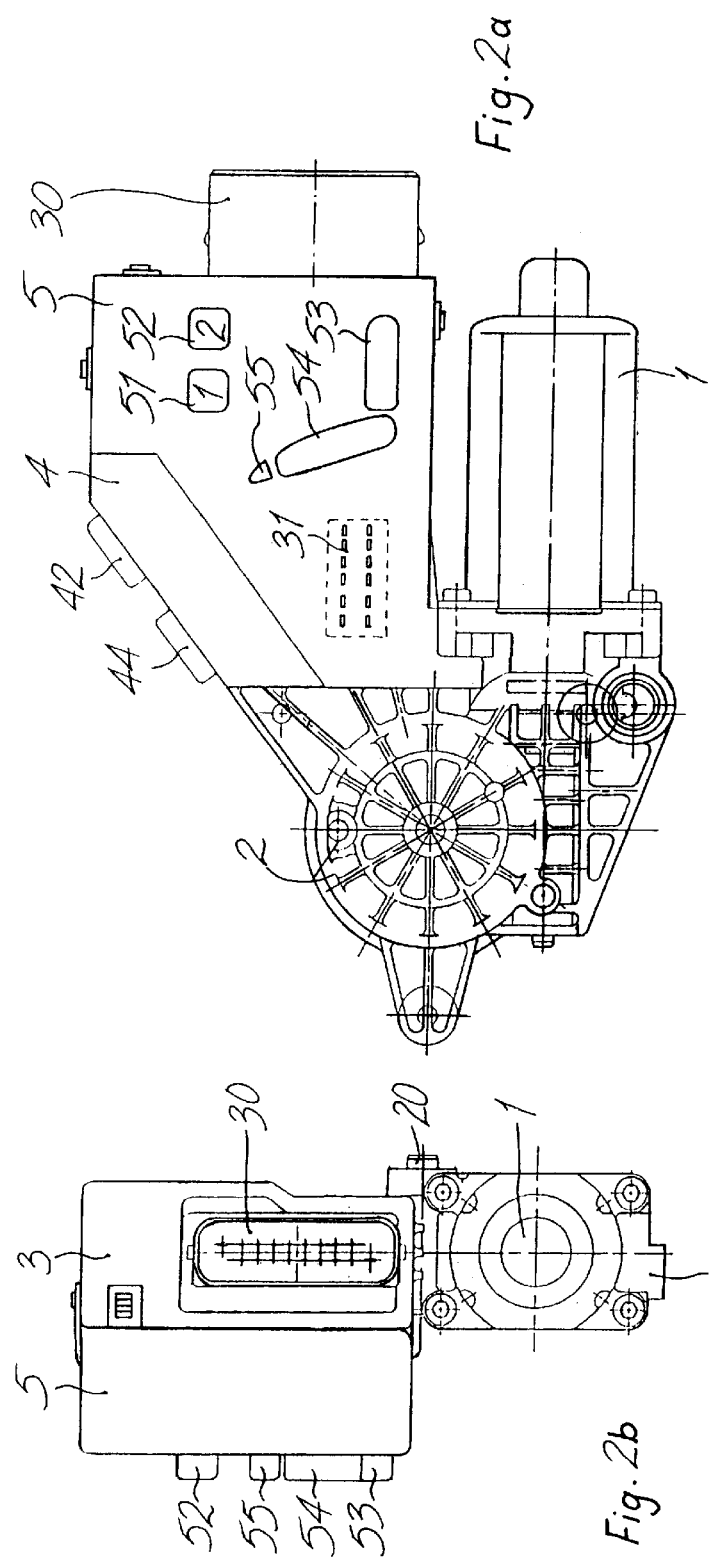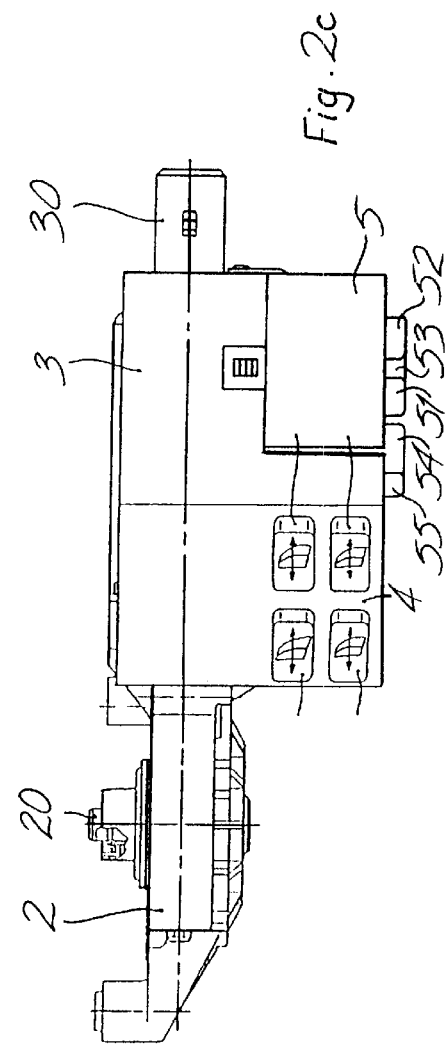

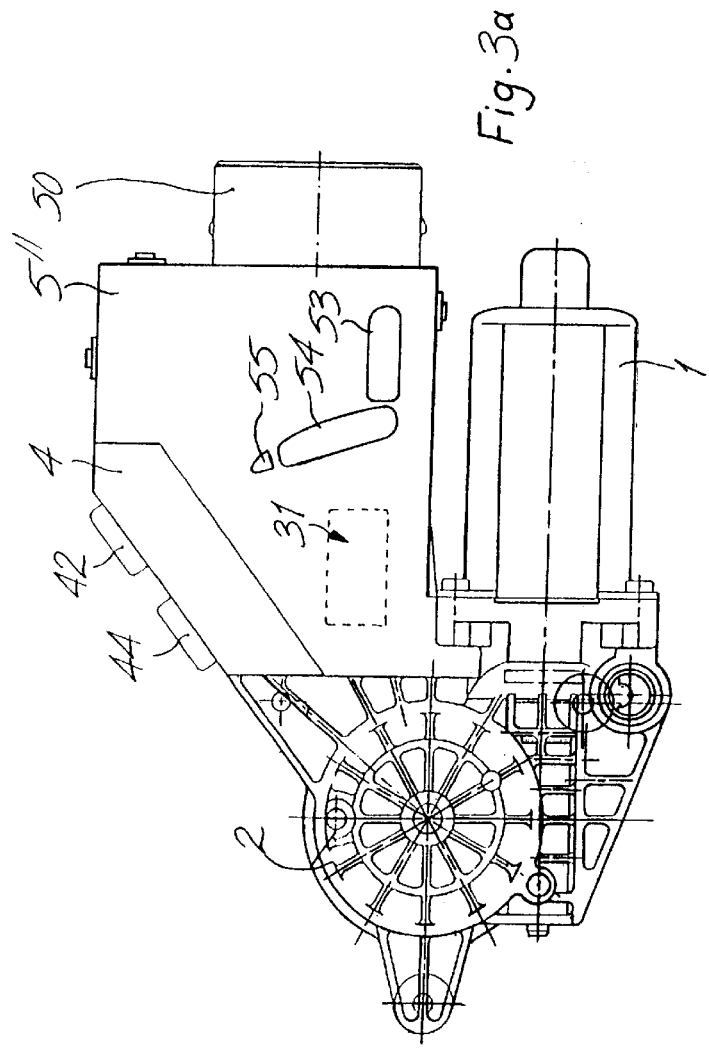
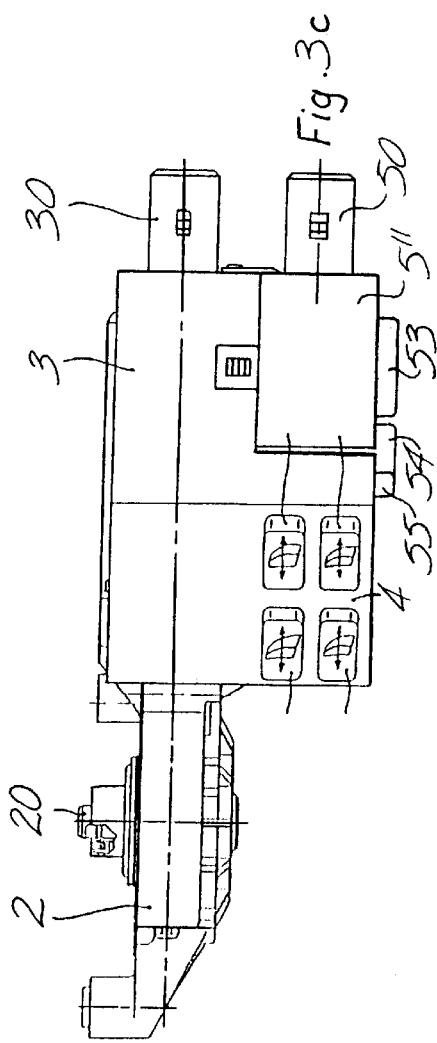
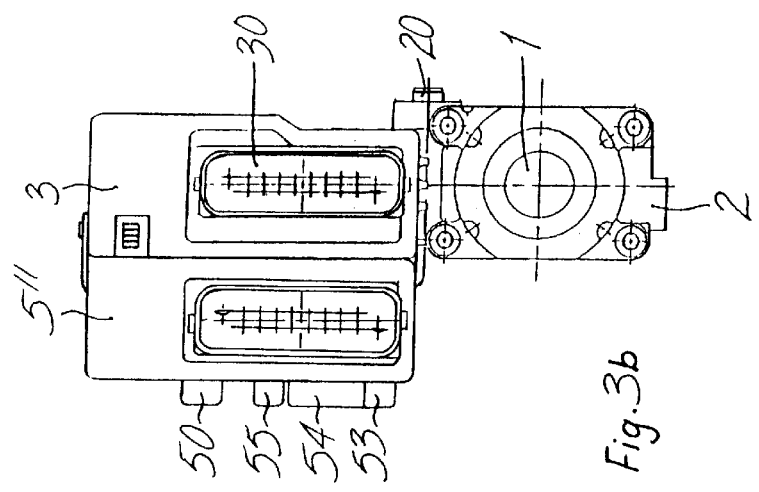

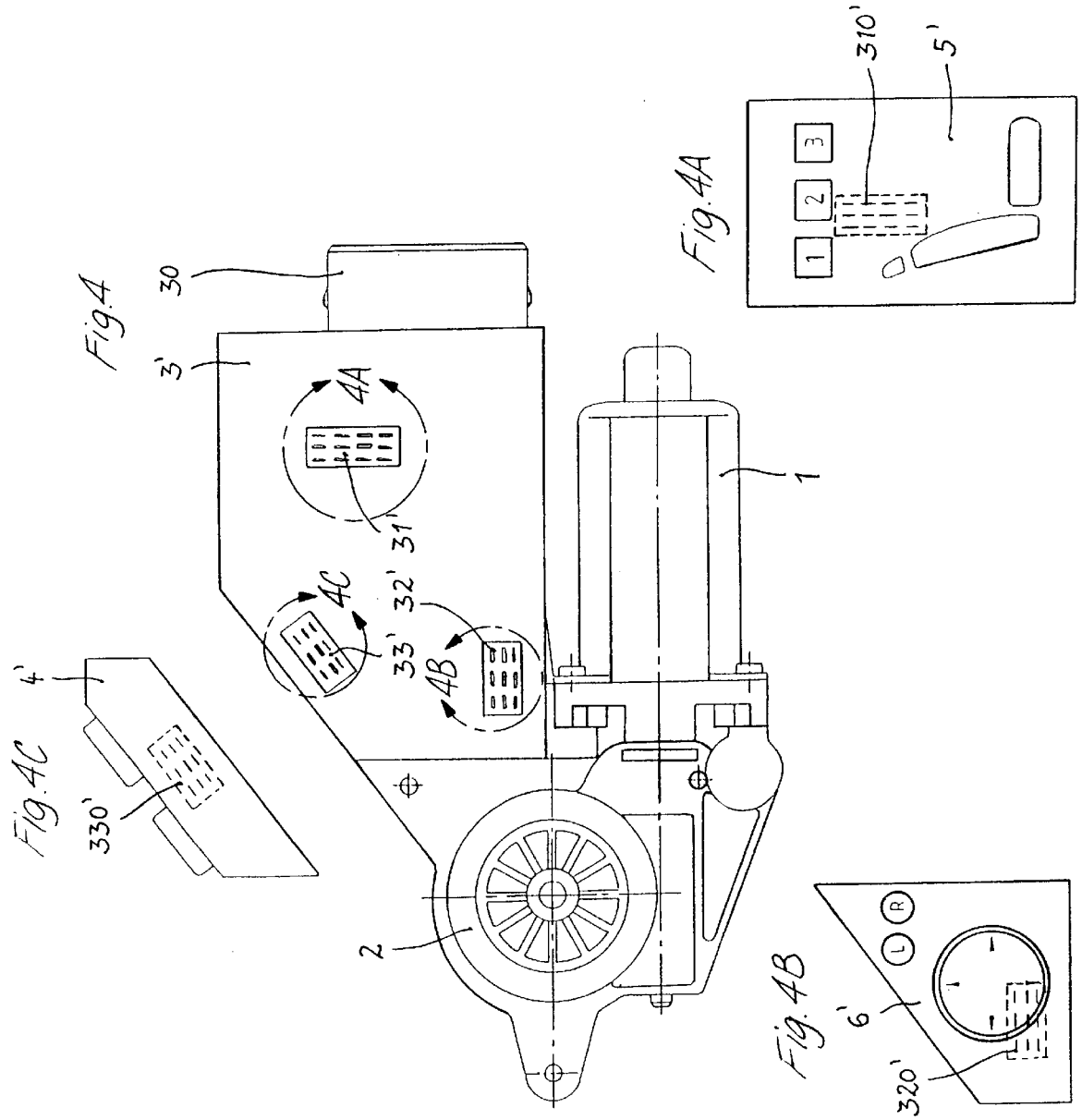

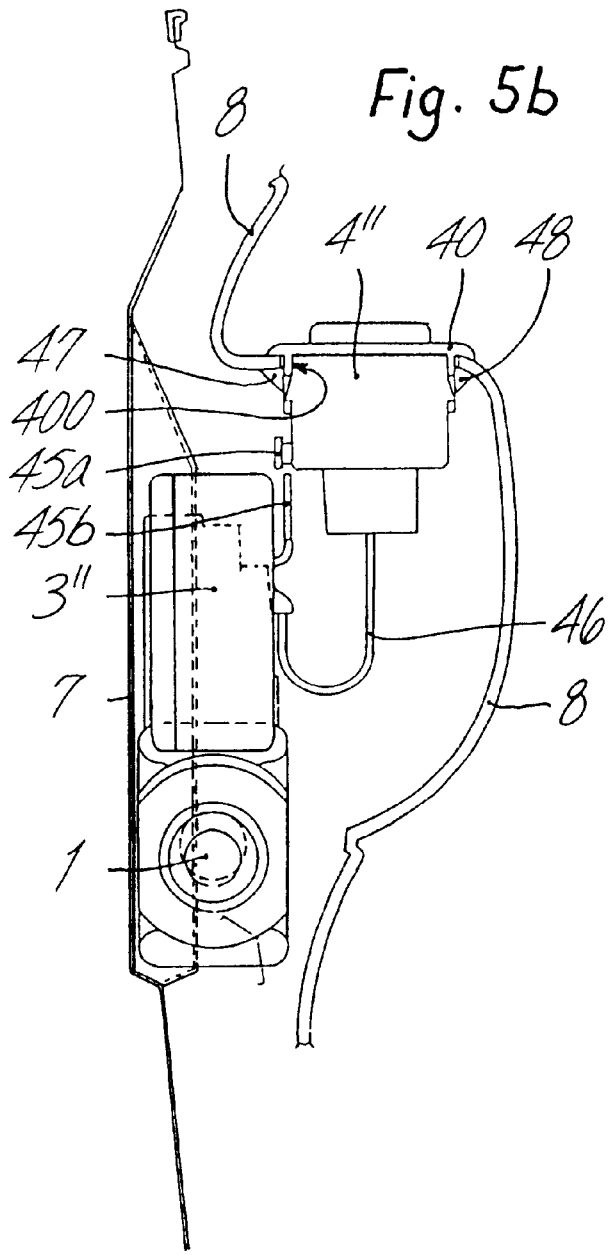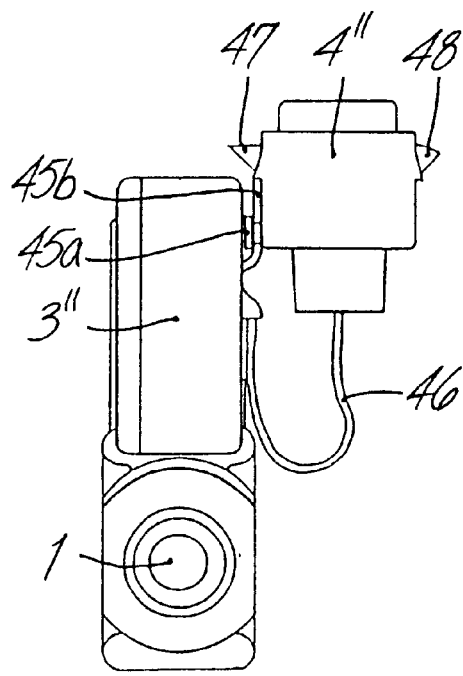

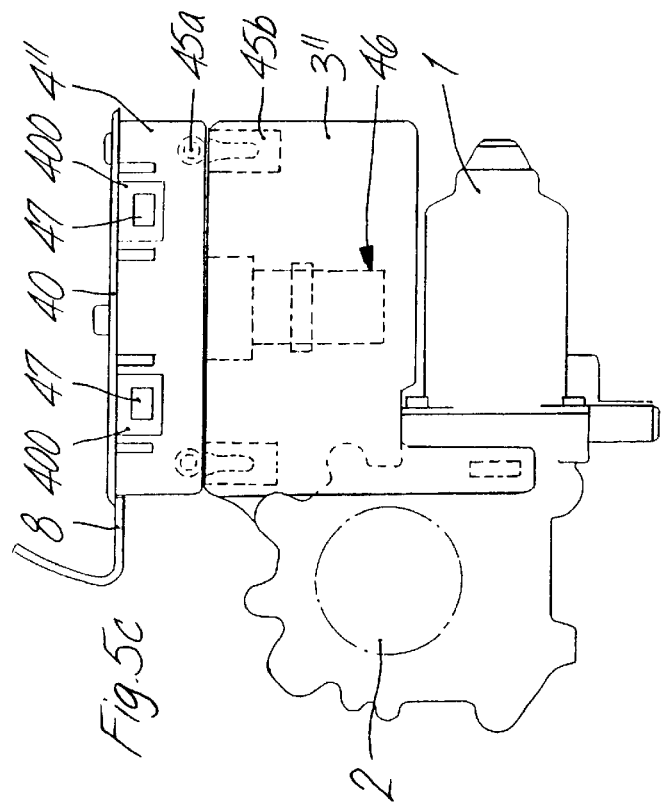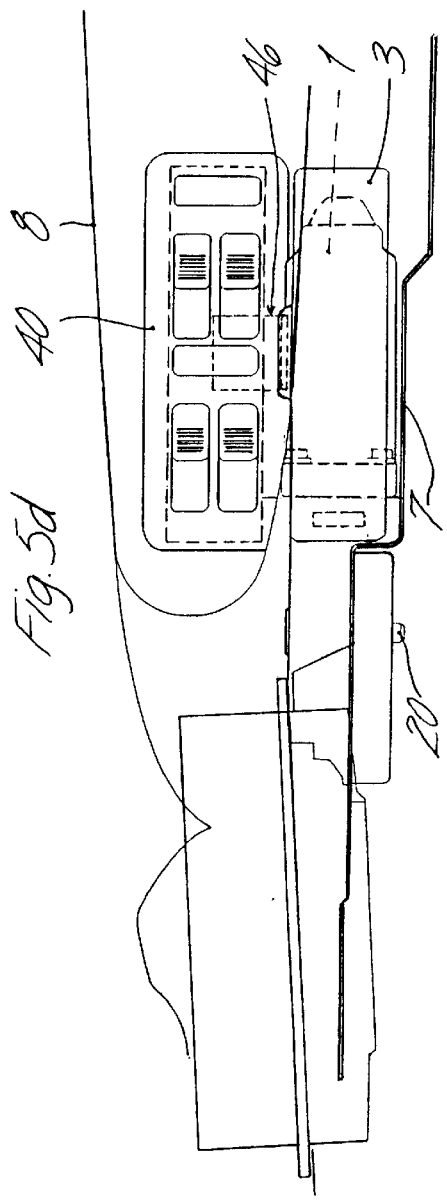

ELECTROMECHANICAL CONTROL UNIT FOR ADJUSTING DEVICES IN MOTOR VEHICLES

DESCRIPTION

The invention relates to an electromechanical control unit for adjustment devices in motor vehicles and can be used with particular advantage in conjunction with a window lift drive in a vehicle door.

Published PCT application no. WO 91/01060 discloses a drive unit for an electromotor-operated window lift which consists of a motor with gearing as well as a control and regulating electronics system. The gear housing is designed so that the control and regulating electronics system can be inserted therein. The drive unit is connected to a separately fitted switch by a plug attached to the electronics system for producing control signals and supplying a voltage source.

The drive unit described provides a relatively compact structural assembly, but the electronically conductive connection between this unit and the switch block can only be produced in the course of completing the vehicle door. This causes increased assembly costs compared to a separately designed modular structure. A joint pre-testing of the drive unit, including the switch, is not possible.

German Patent No. 36 09 609 C2 describes an assembly unit, consisting of an electronics module, plug elements, and operating switches, which is to be installed in a vehicle door and is connected through a cable train to the functioning elements, such as the mirror adjustment, central locking and/or window drive. The housing of this assembly unit is mounted either in a part of the inner cladding of the door (e.g., the arm rests) or on the inside panel of the door.

Even here there is the drawback that the electronics switch module must subsequently be connected by cable to the electrical functioning unit. Testing all the electrical and electronic parts operating together can only be carried out after completion of the vehicle door.

SUMMARY

According to one embodiment of the invention, an electromechanical control unit for adjustment devices in motor vehicles, more particularly for a window lift, is provided. The control unit includes an electromechanical drive with an electromotor with gearing, an electronics system having a housing and in active connection with the electromotor, at least one switch in active connection with the electronics system for issuing control commands to at least one functional unit, and at least one further switch for controlling at least one further functional element, for example an electrical seat or mirror adjustment. The switches are mechanically fixable and electronically connectable to the electromechanical drive and the housing enclosing the electronics system to form a modular unit which may be built into a larger functional system, such as a vehicle door module. The switch for controlling the at least one further functional element is connected to the electronics system through an electrical plug contact and has a common serial interface with the electrical plug contact.

With an embodiment of the invention, it is possible to increase the degree of integration of the electrical and electronic components for adjustment devices and other functional groups in motor vehicles and to reduce the manufacturing and testing costs.

According to another embodiment of the invention, an electromechanical drive, electronics system and at least one switch form a pre-testable modular unit. For a practical embodiment of this unit, it is necessary to match the spatial requirements of the adjustment device connected to the drive on one side and the position of the switches required to generate control signals on the other side with each other in view of the available space in the vehicle door. It should be ensured that no, or only insignificantly slight movements are transferred to the switches through the forces arising from the electromechanical drive and thus minimizing elastic deformations of the supporting parts connected therewith. This can be achieved according to one embodiment which provides an elastic floating connection between the switch and the electronics system. The switch should thereby be in positive engagement with a cover, for example the inner cladding of the door. In an alternate embodiment, the switch is connected to the electronics system by a flexible electrical lead wherein the switch is also supported by a cover or the like.

According to a preferred embodiment of the invention, the modular unit supports at least one further switch which is connected to a further electrical functioning element. This can be, for example, an electrical seat adjustor, mirror adjustor or heater. This saves the expense of mounting the second switch separately. The power supply to the modular unit and the electrical connection between the additional switch and further electrical functioning element can be produced through a common serial interface. To expand the modular unit with an additional switch, an electrical plug connection is provided between the switch and the electronics system and is made at the same time as the mechanical connection between the two parts.

A further embodiment of the invention provides for mounting a switch for controlling at least a further electrical functioning element in a separate housing and equipping it with its own electrical output. Thus the connection of the switch with the modular unit is still mechanical. Insofar as the additional electrical functioning element, for example an electrical seat adjustor, is to have a separate electronics control system, this can either be mounted in the housing of the associated switch or in the vicinity of the functioning unit of the seat adjustment system. Alternatively, in the case where both electrical functioning elements, for example, the window lift and seat adjustor, are to be fitted with one electronic control unit, not only would the spatial arrangement of the electronics system in a common housing be advantageous, but also their functional connection. Any relays which may be necessary to switch power supplies can be fitted at a place remote from the modular unit.

When using the modular unit according to the invention in conjunction with an electric window lift, the window lift is preferably prefitted on a relatively stable support plate on the dry chamber side of the door. It is thereby possible to dispense with the cost-intensive measures needed to protect the sensitive electrical components from moisture.

BRIEF DESCRIPTION OF THE DRAWINGS

The invention will now be explained in further detail with reference to the embodiments shown in the drawings in which:

FIG. 1 shows various views of an electromechanical control unit provided for a window lift wherein FIG. 1a is a side view, FIG. 1b is a plan view on the plug side, FIG. 1c is a plan view on the switch side;

FIG. 2 shows the modular unit according to FIGS. 1a to 1c in various views but expanded through a switch for in electrically operated seat adjustment wherein FIG. 2a is a side view, FIG. 2b is a plan view on the plug side, FIG. 2c is a plan view on the switch side;

FIG. 3 shows the modular unit according to FIGS. 1a to 1c in various views but expanded by a switch with separate electrical input for an electrically operated seat adjustment wherein FIG. 3a is a side view, FIG. 3b is a plan view on the plug side, FIG. 3c is a plan view on the switch side;

FIG. 4 including FIGS. 4A, 4B, and 4C, form a diagrammatic illustration of an electromechanical control unit for an electrically operated window lift according to one embodiment and additional switch blocks for an electronic seat memory as well as an electrical mirror adjustment;

FIG. 5a shows an electromechanical control unit with flat band cable connection between the electronics system and switch block in the transport position;

FIG. 5b is a sectional view through the electromechanical control unit of FIG. 5a in the installed position in a motor vehicle door;

FIG. 5c is a side view of the electromechanical control unit of FIG. 5a in the installed position; and FIG. 5d is a plan view of the switch area of a motor vehicle door including the electromechanical control unit of FIG. 5a.

DETAILED DESCRIPTION

The views shown in FIGS. 1a to 1c illustrate a minimal structure of an electromechanical control unit 100 for an electrically driven window lift according to one embodiment of the invention. The electromechanical control unit only comprises one electronics system 3 with only one switch block 4 for an electromechanical drive including a motor 1 and gearing 2. The switch block 4 mounted on a side of the control unit 100 thereby forms one unit with the housing of the electronics system 3. The individual button switches 41,42,43,44 for operating the four side window panes of a vehicle are part of a drive and control unit on the driver's side. More advantageous however is the production of the modular unit according to the invention using a separate switch block 4 which is connectable with the electronics system 3. Thus it is easily possible to generate a new variation solely by replacing the illustrated switch block for the driver's seat 4 by a switch block intended for a vehicle seat in the rear compartment. The electronics system 3 and the motor 1 are supplied with electrical energy through a plug connection 30. Signals such as the switching states of the ignition lock or the locking state of the door can be transferred through this plug connection 30.

The embodiment of the invention according to FIGS. 2a to 2c has additionally a switch block 5 for an electrical seat adjustment, but otherwise corresponds to the above-described unit of FIG. 1. In the side wall of the electronics system 3 underneath the switch block 4 for the window lift is a plug connection 31 (shown in shadow in FIG. 2a) through which the switch block 5 for the seat adjustment can be connected to the electronics system 3. In the present case this is a switch 5 for a seat adjustment with a memory function whereby the relevant programmed seat positions can be retrieved from memory and re-established by operating the buttons 51, 52. A button combination 53,54,55 symbolically imitating the seat is available for the deliberate accurate adjustment of the seat cushion, backrest and head rest.

The two switch blocks 4,5 have a common serial interface in the plug connection 30. Two different embodiments of this variation of the invention are therefore available. The electronics system 3 can undertake control of both the window lift and the seat adjustment mechanisms or alternatively, the switch block contains a separate electronics system for seat adjustment which is connected with the serial interface 30 through the plug connection 31. Thus, depending on which of these alternate embodiments is utilized, the plug connection 31 is optionally covered by the trim of the vehicle.

A further embodiment is shown in FIGS. 3a to 3c. Here the modular electromechanical control unit is completed with a switch block 5" which is associated with a seat adjustment without memory electronics. Furthermore the switch block 5"', through which the power supply is connected, has a separate plug connection 50 to which is attached the cable (not shown) for the seat adjustment. With this embodiment, the optional plug connection 31 may be used for forwarding signals (for example ignition lock) which are supplied to the window lift electronics system 3 through the plug connection 30.

The modular unit shown in FIG. 4 has a particularly high degree of integration. It has a plug block 4',5',6' for each of the window lift drive 4', seat adjustment 5' and mirror adjustment 6', wherein these are contacted through plug connections 31',310', 32', 320', 33', 330' with the common electronics system 3'. All contacts necessary for the power supply and other signal exchange are realized through the plug connection 30. With this embodiment, it is possible to produce a large number of optional variations at reasonable costs.

At this point it should be pointed out that the elastic connection which are provided between the electronics systems 3,3' and the switch blocks 4,4',5,5',6' can compensate for manufacturing tolerances between the fixing point of the modular unit 100 and the inner cladding 8 of the door. Also with the transfer of mechanical drive energy through drive shaft 20 (see FIGS. 1b, 2b and 3b) to the adjustment system of the window lift, elastic deformations can occur on the supporting parts of the door which make a corresponding movement compensation necessary.

Another embodiment of the invention is shown in FIGS. 5a to 5d which uses a flexible flat band cable 46 between the electronics system 3" and the switch block 4" and thus offers adequate provisions for compensating relative movements. According to this embodiment, the motor 1, gearing 2 and electronics system 3" fit rigidly together and are mounted on the inner panel 7 of the door or on a support plate, whereas the switch block 4" is supported by the inner cladding 8 of the door. A cover plate 40 inserted in the inner cladding 8 of the door has a bracket plate 400 directed downwards into the interior of the door and which is provided with recesses into which the projections 47,48 of the switch housing 4" can be clip fitted. This allows a simple fixing of the switch block 4" on the inner cladding 8 of the door (see FIGS. 5b and 5c). Relative movements between the parts 1,2,3" fixed on the inner panel 7 of the door and the switch block 4" are compensated without problem by the flexible flat band cable 46.

FIG. 5a shows the modular unit according to the invention in its transport position before assembly in the door. The housing of the electronics system 3" supports a fork-shaped upwardly open transport holder 45b in which a suitably fitting bolt-like transport holder 45a of the switch block 4" can engage. The transport position is selected so that during upward movement of the switch block 4" which takes place during fitting directly the transport holder 45a, 45b is released it can be fixed on the cover plate 40 and thus on the inner cladding 8 of the door.

The plan view of the switch area of a vehicle door designed for the driver is shown in FIG. 5d. Buttons for operating the four window lifts are accessible through the cover plate 4.

We claim:

1. An electromechanical control unit for a window lift in motor vehicles, comprising:
   an electromechanical drive comprising an electromotor with gearing;
   an electronics system, having a housing, coupled with the electromotor;
   at least one switch coupled with the electronics system for issuing control commands to at least one functional unit; and
   at least one further switch for controlling at least one further functional unit,
   wherein the switches are mechanically fixable and electronically connectable to the electromechanical drive and the housing enclosing the electronics system to form a modular unit for building into a larger functional system, and wherein the at least one further switch for controlling the at least one further functional unit is connected to the electronics system through an electrical plug contact and wherein said at least one further switch has a common serial interface with the electrical plug contact.

2. The electromechanical control unit according to claim 1 further comprising a cover, wherein at least a portion of each switch engages positively with the covers, and wherein the switch is in elastic floating connection with the electronics system.

3. The electromechanical control unit according to claim 1 further comprising a cover, wherein at least a portion of each switch is in positive keyed engagement with the cover, and wherein the switch is connected to the electronics system through a flexible electric lead.

4. The electromechanical control unit according to claim 1 wherein the at least one further switch for controlling the at least one further electrical functioning unit is mounted in a separate housing from the electromechanical drive and electronics system and can be combined selectively with the electromechanical control unit.

5. The electromechanical control unit according to claim 1 wherein the at least one further switch for controlling an electrical seat adjustment system, and wherein the at least one switch has a separate electrical connection for connection to the seat adjustment system.

6. The electromechanical control unit according to claim 4 wherein a separate seat electronics system is provided which forms one unit with the at least one further switch.

7. The electromechanical control unit according to claim 1 wherein the at least one futher switch controls an electrical seat adjustment, and wherein the electronics system comprises a window lift electronics system and a seat electronics system forming one unit and that relays required where necessary for the seat adjustment are mounted near the associated drive.

8. The electromechanical control unit according to claim 1 wherein the at least one further switch comprises a seat adjustment switch, and wherein the electronics housing has in the area of the electrical plug contact a removable closure part so that a plug connection can be made between the seat adjustment switch and the electronics system.

9. The electromechanical control unit according to claim 8 wherein the closure part corresponds to an area formed by a plurality of ideal break points and can be broken out of the housing.

10. A door module for a vehicle comprising an inner cladding and the electromechanical control unit according to claim 1,
    wherein the switch for controlling the window lift is mounted in a surface of the door module which is substantially horizontal and the switch for controlling a seat adjustment is mounted in a surface of the inner cladding which runs vertically facing into passenger interior of such vehicle.

11. A door module for a vehicle comprising the electromechanical control unit according to claim 1 prefitted on a support plate on a dry chamber side of the door module.

12. The electromechanical control unit of claim 1 wherein the at least one further functional unit comprises an electrical seat adjustment.

13. The electromechanical control unit of claim 1 wherein the at least one further functional unit comprises an electrical mirror adjustment.

14. The electromechanical control unit of claim 1 wherein a separate seat electronics system is proved which forms one unit with the electrical drive.

15. The electromechanical control unit of claim 1 wherein the electronics system comprises a window lift electronics system and a seat electronics system forming one unit and relays for the seat adjustment are mounted in a separate housing.

* * * * *